United States Patent

Tabata

Patent Number: 5,772,554
Date of Patent: Jun. 30, 1998

[54] APPARATUS FOR CONTROLLING VEHICLE ENGINE-BRAKING FORCE UPON SHIFT-DOWN ACTION OF AUTOMATIC TRANSMISSION

[75] Inventor: Atsushi Tabata, Okazuki, Japan

[73] Assignee: Toyota Jidosha Kabushiki Kaisha, Toyota, Japan

[21] Appl. No.: 721,378

[22] Filed: Sep. 26, 1996

[30] Foreign Application Priority Data

Sep. 29, 1995 [JP] Japan ................................ 7-253057

[51] Int. Cl.$^6$ ................................ B60K 41/06
[52] U.S. Cl. ........................... 477/109; 477/118
[58] Field of Search .................... 477/107, 109, 477/110, 118, 111

[56] References Cited

U.S. PATENT DOCUMENTS

| | | | |
|---|---|---|---|
| 4,523,667 | 6/1985 | Smyth | 477/109 |
| 4,785,691 | 11/1988 | Papenhagen et al. | 477/107 |
| 4,891,759 | 1/1990 | Kato | 477/107 |
| 5,441,464 | 8/1995 | Markyvech | 477/109 |

FOREIGN PATENT DOCUMENTS 6-1166   1/1994   Japan .

*Primary Examiner*—Charles A. Marmor
*Assistant Examiner*—Sherry Lynn Estremsky
*Attorney, Agent, or Firm*—Oblon, Spivak, McClelland, Maier & Neustadt, P.C.

[57] ABSTRACT

Apparatus for controlling an engine-braking force to be applied to a motor vehicle, including (a) a throttle valve drive device for operating a throttle valve to change an amount of opening of the throttle valve, (b) a throttle opening control device which is operated upon a manual shift-down action of the automatic transmission as a result of operation of an operator's controlled member, for increasing the amount of opening of the throttle valve to temporarily increase an engine speed to a level which is expected to be established after the manual shift-down action, so as to assure smooth application of engine braking to the motor vehicle, and (c) a throttle opening control enabling/disabling device for inhibiting an operation of the throttle opening control means when a predetermined condition is satisfied after completion of the manual shift-down action of the automatic transmission, and permitting the operation of the throttle opening control means when the predetermined condition is not satisfied. For example, the throttle opening control enabling/disabling device inhibits the operation of the throttle opening control device if the operation of the throttle opening control device to reduce the throttle valve opening is delayed.

22 Claims, 15 Drawing Sheets

FIG. 2

|     | C0 | C1 | C2 | B0 | B1 | B2 | B3 | B4 | F0 | F1 | F2 |
|-----|----|----|----|----|----|----|----|----|----|----|----|
| N   | ○  |    |    |    |    |    |    |    |    |    |    |
| Rev |    |    | ○  | ○  |    |    |    | ○  |    |    |    |
| 1st | ○  | ○  |    |    |    |    |    | ●  | ○  |    | ○  |
| 2nd | ●  | ○  |    |    |    |    | ○  |    | ○  |    |    |
| 3rd | ○  | ○  |    |    | ●  | ○  |    |    | ○  | ○  |    |
| 4th | ○  | ○  | ○  |    |    |    |    |    | ○  |    |    |
| 5th |    | ○  | ○  | ○  |    |    |    |    |    |    |    |

FIG. 9

| SHIFT-DOWN ACTION \ VEHICLE SPEED | ~10km | 10~30km | --------- | 150km~ |
|---|---|---|---|---|
| 2 → 1 | 0.8 sec | — | --------- | 1.0 sec |
| 3 → 1 | 0.1 sec | — | --------- | — |
| — | — | — | --------- | — |
| | | | | |
| 5 → 3 | 1.1 sec | — | --------- | 2.0 sec |
| 5 → 4 | 1.2 sec | — | --------- | 2.5 sec |

FIG. 10

| SHIFT-DOWN ACTION \ VEHICLE SPEED | ~10km | 10~30km | --------- | 150km~ |
|---|---|---|---|---|
| 2 → 1 | 1.1 sec | — | --------- | 1.3 sec |
| 3 → 1 | 1.3 sec | — | --------- | — |
| — | — | — | --------- | — |
| | | | | |
| 5 → 3 | 1.4 sec | — | --------- | 2.3 sec |
| 5 → 4 | 1.5 sec | — | --------- | 2.8 sec |

FIG. 14

| VEHICLE SPEED / NEWLY ESTABLISHED POSITION | ~10km | 10~30km | --------- | 150km~ |
|---|---|---|---|---|
| 1 | 5 km | — | --------- | 50 km |
| 2 | 5 km | — | --------- | 40 km |
| 3 | 4 km | — | --------- | 30 km |
| 4 | 4 km | — | --------- | 20 km |

APPARATUS FOR CONTROLLING VEHICLE ENGINE-BRAKING FORCE UPON SHIFT-DOWN ACTION OF AUTOMATIC TRANSMISSION

BACKGROUND OF THE INVENTION

1. Field of the Invention

The present invention relates to an apparatus for controlling an engine-braking force in a motor vehicle, and more particularly to techniques for controlling a throttle valve during a manual shift-down action of an automatic transmission as a result of operation of an operator's controlled member, so as to assure smooth engine brake application to the vehicle after the shift-down action.

2. Discussion of the Related Art

There is known an engine-braking force control apparatus for a motor vehicle, which includes a throttle valve drive device for operating a throttle valve of an engine to change an amount of opening of the throttle valve according to a drive signal, and throttle opening control means which is operated upon a manual shift-down action of an automatic transmission as a result of operation of an operator's controlled member, for increasing the amount of opening of the throttle valve to temporarily increase a speed of the engine to a level which is expected to be established after the manual shift-down action of the automatic transmission, so as to assure smooth application of engine braking to the motor vehicle. An example of such an engine-braking force control apparatus is disclosed in JP-A-6-1166.

In the known engine-braking force control apparatus described above, the opening of the throttle valve is opened by the throttle opening control means to temporarily increase the engine speed to a level expected to be established after a manual shift-down action of the automatic transmission, so as to suitably minimize a shock due to an increase in the engine-braking force during or after the shift-down action. Further, the throttle opening control means is adapted to reduce the opening of the throttle valve at a predetermined rate after the completion or termination of the shift-down action of the transmission, so as to gradually reduce the engine output for assuring smooth application of engine braking to the vehicle after the shift-down action of the transmission.

However, the throttle opening control means of the known engine-braking control apparatus tends to suffer from a delay in returning the once increased opening of the throttle valve to the original value before the shift-down action of the transmission. The delayed reduction of the throttle opening after the shift-down action of the transmission may give the vehicle operator an impression that the vehicle is not decelerated with a high response to the shift-down action of the transmission.

SUMMARY OF THE INVENTION

It is therefore an object of the present invention to provide an engine-braking force control apparatus for a motor vehicle, which is capable of reducing the once increased opening of the throttle valve after the manual shift-down action of the automatic transmission, so that the vehicle may be decelerated with a high response to the shift-down action of the transmission.

The above object may be achieved according to the principle of the present invention, which provides an apparatus for controlling an engine-braking force to be applied to a motor vehicle having an engine with a throttle valve, and an automatic transmission, the apparatus comprising: (a) a throttle valve drive device for operating the throttle valve to change an amount of opening of the throttle valve according to a drive signal, (b) throttle opening control means, operable upon a manual shift-down action of the automatic transmission as a result of operation of an operator's controlled member, for increasing the amount of opening of the throttle valve to temporarily increase a speed of the engine to a level which is expected to be established after the manual shift-down action, so as to assure smooth application of engine braking to the motor vehicle; and (c) throttle opening control enabling/disabling means for inhibiting an operation of the throttle opening control means when a predetermined condition is satisfied after completion of the manual shift-down action of the automatic transmission, and permitting the operation of the throttle opening control means when the predetermined condition is not satisfied.

In the engine-braking force control apparatus of the present invention constructed as described above, the throttle opening control enabling/disabling means permits the operation of the throttle opening control means as long as the predetermined condition is not satisfied after the completion of the manual shift-down action of the automatic transmission, and inhibits the operation of the throttle opening control means when the above predetermined condition is satisfied. Since the predetermined condition may be determined so as to detect a delayed operation of the throttle opening control means to reduce the once increased opening of the throttle valve after completion of the shift-down action of the transmission, the throttle opening control enabling/disabling means is capable of effectively preventing delayed deceleration of the vehicle with a low response to the manual shift-down action of the automatic transmission.

In a first preferred form of the present invention, the apparatus further comprises a throttle drive force control device disposed between the throttle valve and the throttle valve drive device, for mechanically controlling a drive force to be transferred from the throttle valve drive device to the throttle valve. In this form of the invention, the throttle opening control enabling/disabling means activates the throttle drive force control device to inhibit the operation of the throttle opening control means when the predetermined condition is satisfied, for example, when the delayed operation of the throttle opening control means to reduce the throttle valve opening is detected. With the throttle drive force control device being activated when the predetermined condition is satisfied, the throttle valve can be mechanically controlled by the throttle drive force control device to reduce the once increased opening of the throttle valve after the shift-down action of the automatic transmission.

However, the throttle drive force control device disposed between the throttle valve and the throttle valve drive device is not essential. Where this throttle drive force control device is not provided, the throttle valve drive device is adapted to be electrically controlled, and the enabling/disabling means inhibits the operation of the throttle opening control means, by commanding the throttle valve drive device to fully close the throttle valve.

In a second preferred form of the present invention, the throttle opening control means is adapted to reduce the amount of opening of the throttle valve after completion of the manual shift-down action of the automatic transmission, and the throttle opening control enabling/disabling means comprises comparing means for comparing a time lapse from a selected moment of the manual shift-down action of the automatic transmission, with a predetermined threshold, and determining means for determining a delayed operation of the throttle opening control means to reduce the amount of opening of the throttle valve after completion of the manual shift-down action when the time lapse is equal to or larger than the predetermined threshold. In the present form of the invention, the throttle opening control enabling/disabling means determines that the predetermined condition is satisfied when the determining means determines the delayed operation of the throttle opening control means to reduce the amount of opening of the throttle valve.

In one advantageous arrangement of the above second preferred form of the invention, the comparing means is adapted to measure the time lapse from a moment of initiation of the manual shift-down action of the automatic transmission.

In another advantageous arrangement of the above second preferred form of the invention, the comparing means is adapted to measure the time lapse from a moment of completion of the manual shift-down action of the automatic transmission.

In a further advantageous arrangement of the same form of the invention, the comparing means is adapted to determine the predetermined threshold on the basis of a running speed of the motor vehicle and a position of the automatic transmission after completion of the manual shift-down action, and according to a predetermined relationship between the predetermined threshold and the running speed and the position of the automatic transmission.

In a third preferred form of this invention, the throttle opening control means is adapted to reduce the amount of opening of the throttle valve after completion of the manual shift-down action of the automatic transmission, and the throttle opening control enabling/disabling means comprises comparing means for comparing a selected speed corresponding to a running speed of the motor vehicle after completion of the manual shift-down action of the automatic transmission, with a predetermined threshold, and determining means for determining a delayed operation of the throttle opening control means to reduce the amount of opening of the throttle valve after completion of the manual shift-down action when the selected speed is equal to or higher than the predetermined threshold, the throttle opening control enabling/disabling means determining that the predetermined condition is satisfied when the determining means determines the delayed operation of the throttle opening control means to reduce the amount of opening of the throttle valve.

In one advantageous arrangement of the above third preferred form of the invention, the selected speed indicated above is the running speed of the motor vehicle after completion of the manual shift-down action of the automatic transmission. Alternatively, the selected speed is a rotating speed of a rotary member of the automatic transmission after completion of the manual shift-down action of the automatic transmission. The rotary member may be an output shaft or an input shaft of the automatic transmission.

In another advantageous arrangement of the above third preferred form of the invention, the comparing means is adapted to determine the predetermined threshold on the basis of a running speed of the motor vehicle before initiation of the manual shift-down action of the automatic transmission and a position of the automatic transmission after completion of the manual shift-down action, and according to a predetermined relationship between the predetermined threshold and the running speed and the position of the automatic transmission.

In a fourth preferred form of the invention, the throttle opening control means reduces the amount of opening of the throttle valve after completion of the manual shift-down action of the automatic transmission, and the throttle opening control enabling/disabling means comprises determining means for determining whether the motor vehicle is in the proces of acceleration after completion of the manual shift-down action of the automatic transmission. The determining means determines that the predetermined condition is satisfied, if the motor vehicle is in the process of acceleration after completion of the manual shift-down action.

In the above fourth preferred form of the invention, the determining means of the throttle opening control enabling/disabling means may be adapted to determine whether the vehicle is in the process of acceleration, on the basis of a rate of change of a running speed of the vehicle during a period from a moment before initiation of the manual shift-down action of the transmission to a moment after completion of the manual shift-down action.

In a fifth preferred form of the invention, the throttle opening control means is adapted to reduce the amount of opening of the throttle valve after completion of the manual shift-down action of the automatic transmission, to a value immediately before initiation of the manual shift-down action of the automatic transmission.

In a sixth preferred form of the invention, the throttle opening control means is adapted to reduce the amount of opening of the throttle valve after completion of the manual shift-down action of the automatic transmission, to a value corresponding to a position of an accelerator pedal after completion of the manual shift-down action of the automatic transmission.

In a seventh preferred form of the invention, the throttle valve drive device comprises a throttle actuator, and the throttle drive force control device comprises a clutch disposed between the throttle valve and the throttle actuator. In this case, the throttle drive force control device may comprise biasing means disposed between the throttle valve and the clutch, for biasing the throttle valve in a direction of reduction of the amount of opening of the throttle valve, so that the amount of opening of the throttle valve is reduced under a biasing force of the biasing means when the clutch is released by the throttle opening control enabling/disabling means when the predetermined condition is satisfied after completion of the manual shift-down action of the automatic transmission.

BRIEF DESCRIPTION OF THE DRAWINGS

The above and optional objects, features, advantages and technical and industrial significance of the present application will be better understood by reading the following detailed description of presently preferred embodiments of this invention, when considered in connection with the accompanying drawings, in which:

FIG. 2 is a table indicating a relationship between the operating positions of the automatic transmission of FIG. 1 and respective combinations of the operating states of frictional coupling devices of the automatic transmission;

FIG. 9 is a view indicating a relationship used for calculating a first threshold value $T_{s^1}$ in the routine of FIG. 7;

FIG. 10 is a view indicating a relationship used for calculating a second threshold value Ts1 in the routine of FIG. 7;

FIG. 14 is a view indicating a relationship used for calculating a value $\Delta V$ in the routine of FIG. 13;

DETAILED DESCRIPTION OF THE PREFERRED EMBODIMENT

Figure 1:
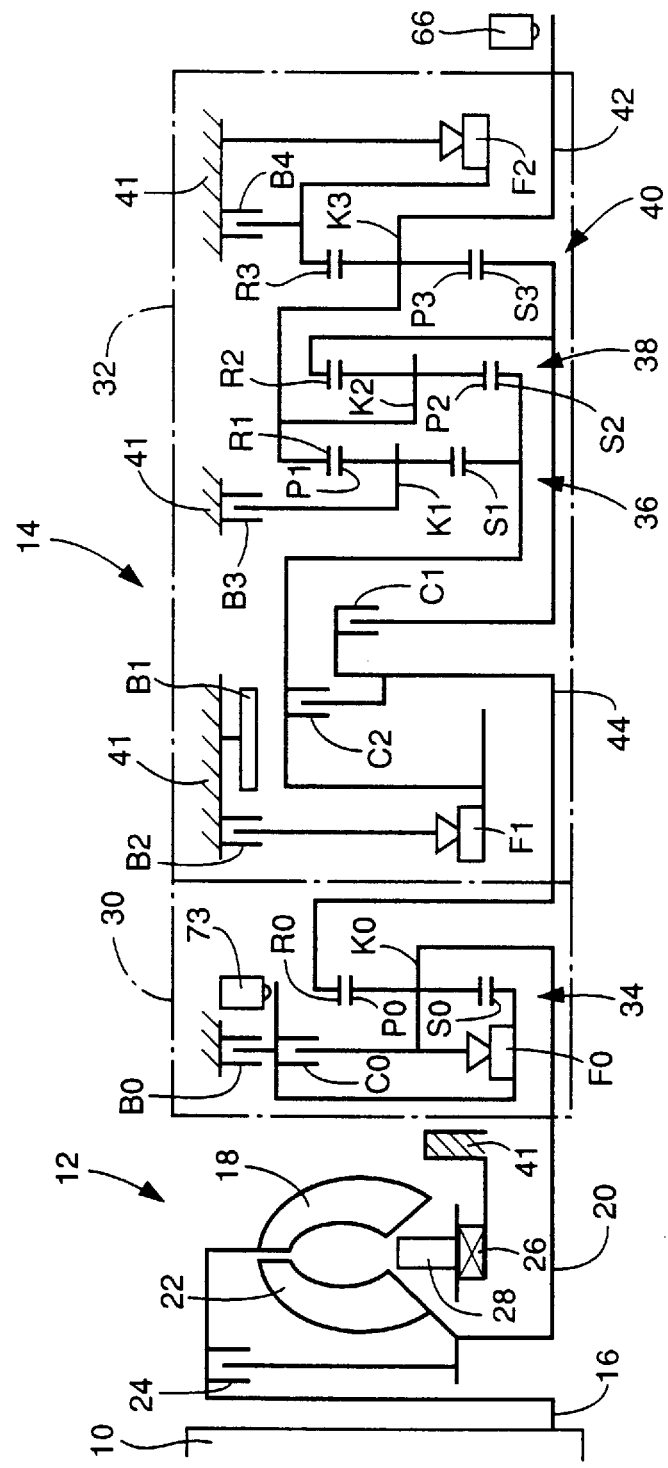
FIG. 1 is a schematic view illustrating a part of a power transmitting system of a motor vehicle, which includes an automatic transmission whose shifting actions are controlled by a shift control apparatus including an engine-braking force control apparatus constructed according to one embodiment of this invention.

Referring first to the schematic view of FIG. 1, there is shown a part of a power transmitting system of a motor vehicle, wherein power generated by an engine 10 is transmitted to an automatic transmission 14 through a torque converter 12, and is then transferred to drive wheels of the vehicle through a differential gear and a drive axle. The transmission 14 is shifted up and down by a shift control apparatus including an engine-braking force apparatus constructed according to one embodiment of the present invention. The shift control apparatus includes an electronic engine controller 76 and an electronic transmission controller 78, which will be described.

The torque converter 12 includes: a pump impeller 18 connected to a crankshaft 16 of the engine 10; a turbine runner 22 fixed to an input shaft 20 of the automatic transmission 14 and rotated by the pump impeller 18; a lock-up clutch 24 for direct connection of the pump impeller 18 and the turbine runner 22; and a stator 28 whose rotation in one direction is inhibited by a one-way clutch 26.

The automatic transmission 14 includes a first transmission unit 30 having a high-gear position and a low-gear position, and a second transmission unit 32 having a rear-drive position and four forward-drive positions. The first transmission unit 30 has a high-low planetary gear set 34, a clutch C0, a one-way clutch F0, and a brake B0. The high-low planetary gear set 34 includes a sun gear S0, a ring gear R0, a carrier K0, and a planetary gear P0 which is rotatably supported by the carrier K0 and which meshes with the sun gear S0 and the ring gear R0. The clutch C0 and the one-way clutch F0 are provided between the sun gear S0 and the carrier K0. The brake B0 is provided between the sun gear S0 and a housing 41 of the automatic transmission 14.

The second transmission unit 32 includes a first planetary gear set 36, a second planetary gear set 38, and a third planetary gear set 40. The first planetary gear set 36 includes a sun gear S1, a ring gear R1, a carrier K1, and a planetary gear P1 which is rotatably supported by the carrier K1 and which meshes with the sun and ring gears S1, R1. The second planetary gear set 38 includes a sun gear S2, a ring gear R2, a carrier K2, and a planetary gear P2 which is rotatably supported by the carrier K2 and which meshes with the sun and ring gears S2, R2. The third planetary gear set 40 includes a sun gear S3, a ring gear R3, a carrier K3, and a planetary gear P3 which is rotatably supported by the carrier K3 and which meshes with the sun and ring gears S3, R3.

The sun gear S1 and the sun gear S2 are integrally connected to each other, while the ring gear R1, carrier K2 and carrier K3 are integrally connected to each other. The carrier K3 of the third planetary gear set 40 is connected to an output shaft 42 of the automatic transmission 14. Further, the ring gear R2 and the sun gear S3 are integrally connected to each other, and a clutch C1 is provided between the series connection of the ring and sun gears R2, S3 and an intermediate shaft 44 of the automatic transmission 14. A clutch C2 is provided between the series connection of the sun gears S1, S2 and the intermediate shaft 44. A band-type brake B1 is fixed to the housing 41, for inhibiting the rotation of the sun gears S1, S2, while a one-way clutch F1 and a brake B2 are provided in series connection with each other between the series connection of the sun gears S1, S2 and the housing 41. The one-way clutch F1 is adapted to be engaged when the sun gears S1, S2 are rotated in a direction opposite to the direction of rotation of the input shaft 20.

A brake B3 is provided between the carrier K1 and the housing 41. A brake B4 and a one-way clutch clutch F2 are provided in parallel between the ring gear R3 and the housing 41. The one-way clutch F2 is adapted to be engaged when the ring gear R3 is rotated in the reverse direction.

The automatic transmission 14 constructed as described above has one rear-drive position and five forward-drive positions which have different speed ratios (the rotating speed of the input shaft 20 divided by the rotating speed of the output shaft 42), as indicated in the table of FIG. 2, wherein those positions are indicated as "Rev" (reverse), "1st" (first-speed), "2nd" (second-speed), "3rd" (third-speed), "4th" (fourth-speed), and "5th" (fifth speed). In FIG. 2, white circles indicate the engaged state of the clutches and brakes, while black circles indicate the engaged state of those clutches and brakes when engine brake is applied to the vehicle. Blank blocks indicate the released state of the clutches and brakes. The speed ratios of the 1st-, 2nd-, 3rd-, 4th- and 5th-speed positions decrease in the order of description.

Figure 3:
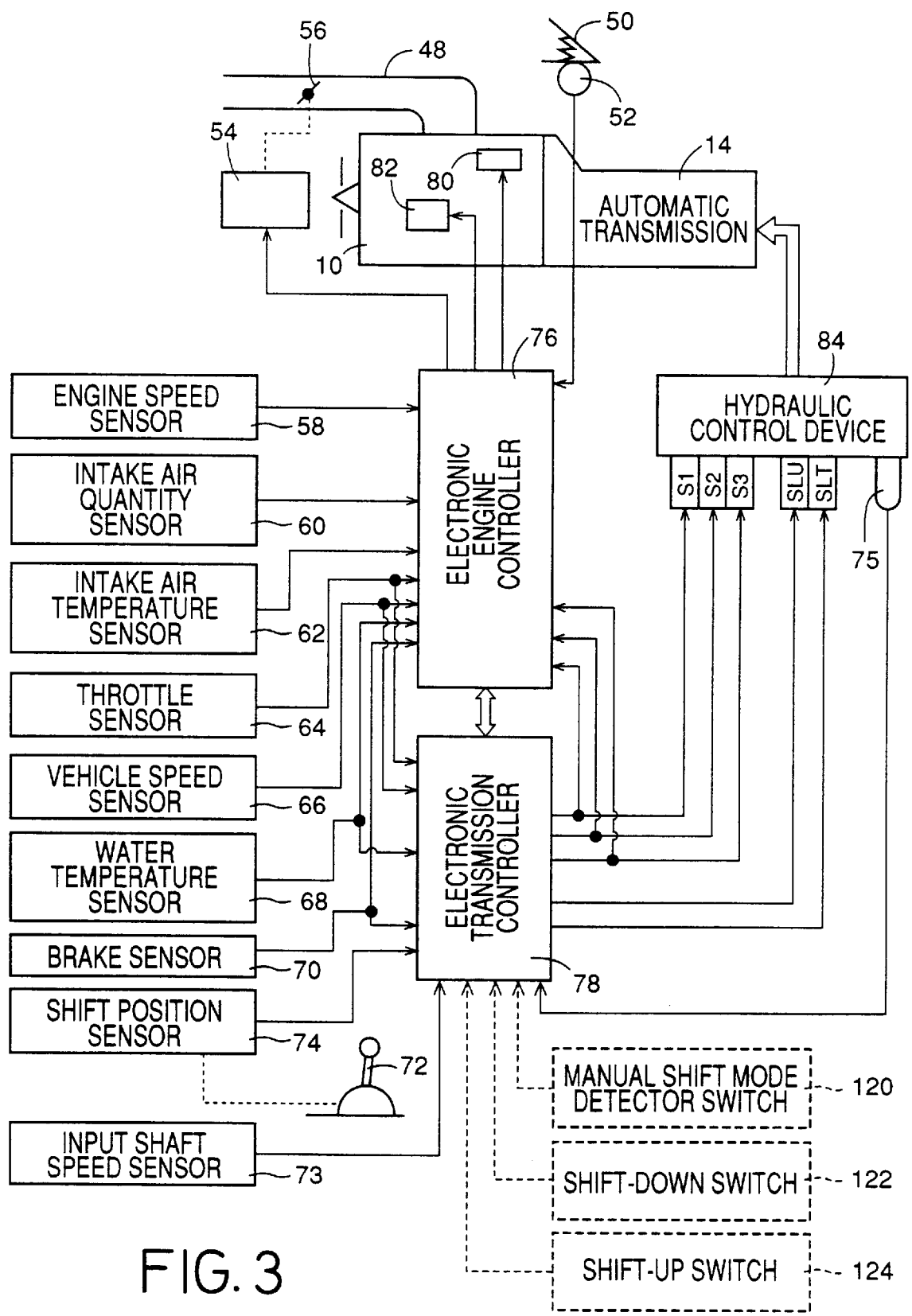
FIG. 3 is a block diagram showing a control system for the motor vehicle, which includes a hydraulic control device, and the shift control apparatus in the form of electronic engine and transmission controllers for controlling a vehicle engine and the automatic transmission of FIG. 1.

Referring next to FIG. 3, there is shown a throttle valve 56 which is disposed in an intake pipe 48 of the engine 10 and is operated by a throttle actuator 54. The engine 10 is controlled by the electronic engine controller 76, while the automatic transmission 14 and the lock-up clutch 24 are controlled by the electronic transmission controller 78. These controllers 76, 78 are adapted to receive output signals of various sensors including: an accelerator position sensor 52 for detecting an amount of operation Acc of an accelerator pedal 50; an engine speed sensor 58 for detecting a speed $N_E$ of the engine 10, namely, the rotating speed of the pump impeller 18; an intake air quantity sensor 60 for detecting an intake air quantity Q of the engine 10; an intake air temperature sensor 62 for detecting a temperature $T_A$ of the intake air; a throttle sensor 64 for detecting an opening angle $\theta_{TH}$ of the throttle valve 56; a vehicle speed sensor 66 for detecting a rotating speed $N_{OUT}$ of the output shaft 42 of the automatic transmission 14 for calculating a running speed V of the motor vehicle; a water temperature sensor 68 for detecting a temperature $T_W$ of a coolant water of the engine 10; a brake sensor 70 for detecting an operation of a brake pedal; a shift position sensor 74 for detecting a currently selected operating position Psh of a shift lever 72; an input shaft speed sensor 73 for detecting a rotating speed $N_{IN}$ of the input shaft 30, namely, a rotating speed $N_{CO}$ of the clutch C0 (which is equal to a speed $N_T$ of the turbine runner 22); and an oil temperature sensor 75 for detecting a temperature $T_{OIL}$ of a working fluid in a hydraulic control device 84. The output signals of those sensors are applied directly or indirectly to the electronic engine and transmission controllers 76, 78.

Figure 4:
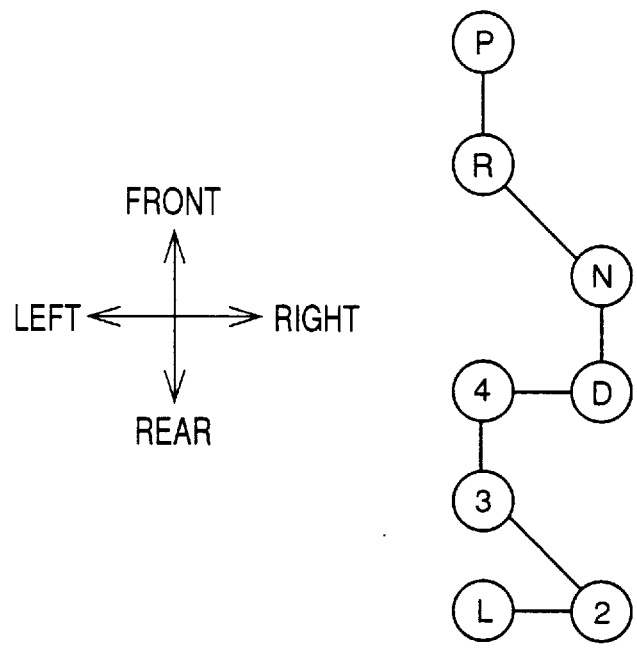
FIG. 4 is a view for explaining operating positions of a shift lever.

The shift lever 72 functions as an operator's controlled member. As shown in FIG. 4, the shift lever 74 has a total of eight operating positions "P" (PARKING), "R" (REAR), "N" (NEUTRAL), "D" (DRIVE), "4", "3", "2" and "L". The shift lever 74 is supported by a suitable mechanism which provides six positions arranged in the running or longitudinal direction of the vehicle, and two positions arranged in the transverse direction of the vehicle. The positions "P", "R", "N" and "D"/"4" are selected by moving the shift lever 74 in the longitudinal direction, while the position "D" or "4", and the position "2" or "L" are selected by moving the shift lever 74 in the transverse direction. When the shift lever 74 is placed in the position "4", the automatic transmission 14 is automatically shifted to a selected one of the 1st-speed, 2nd-speed, 3rd-speed and 4th-speed position. When the shift lever 74 is placed in the position "3", the automatic transmission 14 is automatically shifted to a selected one of the 1st-speed, 2nd-speed and 3rd-speed position. When the shift lever 74 is placed in the position "2", the automatic transmission 14 is automatically shifted to a selected one of the 1st-speed and 2nd-speed position. When the shift lever 74 is placed in the position "L", the automatic transmission 14 is placed in the 1st-speed position. If the operator of the vehicle desires, during running of the vehicle with the shift lever 74 placed in the position "D", to shift down the automatic transmission 14 to the 3rd-speed position at a comparatively high vehicle speed, the operator shifts the shift lever 74 from the position "D" to the position "3".

The engine controller 76 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the engine 10, more specifically, for effecting: a fuel injection control for controlling a fuel injection valve 80 so as to control the amount of fuel injection into the engine 10; an ignition control for controlling an ignitor 82 so as to optimize the ignition timing; a traction control for controlling the second throttle valve 56 via the throttle actuator 54 so as to control the traction force of the vehicle drive wheels while preventing slipping of the drive wheels on the road surface; and a cruising control for controlling the throttle valve 56 so as to maintain the vehicle running speed V at a selected value.

The engine controller 76 is further adapted to control the throttle actuator 54 such that the opening $\theta_{TH}$ of the throttle valve 56 corresponds to the operating amount Acc of the accelerator pedal 50, in principle. When the traction control or cruising control is effected, the opening $\theta_{TH}$ is adjusted by an amount determined in the traction or cruising control. The engine controller 76 is also adapted to increase the opening $\theta_{TH}$, namely, to effect a throttle opening control or so-called "synchro-shift control" when a shift-down action of the automatic transmission 14 is determined by the transmission controller 78 as a result of an operation of the shift lever 74 during running of the vehicle in a manual shift mode. Described more specifically, the synchro-shift control includes an operation of the throttle actuator 54 to increase the opening $\theta_{TH}$ of the throttle valve 56 by a predetermined amount before or during the shift-down action of the automatic transmission 14, so that the engine speed $N_E$ is raised to a level which is expected to be established after the completion of the shift-down action. The throttle valve opening $\theta_{TH}$ is increased for the purpose of maintaining a vehicle drive force at the same value before and after the shift-down action of the transmission 14, to thereby prevent sudden application of engine braking to the vehicle due to the shift-down action of the transmission 14. The synchro-shift control also includes an operation of the throttle actuator 54 to return the opening $\theta_{TH}$ of the throttle valve 56 back to a value before the determination of the shift-down action of the transmission 14, so as to assure smooth engine braking to the vehicle.

The transmission controller 78 is also comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 24 via the hydraulic control device 84 by controlling solenoid-operated valves S1, S2, S3 and S4 and linear solenoid valves SLU, and SLT. For instance, the transmission controller 78 is adapted to apply a command DSLT to the linear solenoid valve SLT to produce a THROTTLE pressure $P_{TH}$ corresponding to the opening $\theta_{TH}$ of the throttle valve 56 or to control an accumulator back pressure of the valve SLT, so that the valve SLT produces a control pressure $P_{SLT}$ corresponding to the command DSLT. The transmission controller 78 is also adapted to apply a command DSLU to the linear solenoid valve SLU so that the valve SLU produces a control pressure $P_{SLU}$, for fully engaging or releasing the lock-up clutch 24, controlling the amount of slip of the lock-up clutch 24, and controlling the brake B3. The transmission controller 78 is connected to the engine controller 76 for data communication with each other, so that one of the controllers 76, 78 may receive necessary signals from the other controller.

The transmission controller 78 is arranged to select one of the operating positions of the automatic transmission 14, on the basis of the detected opening $\theta_{TH}$ of the throttle valve 56 and the detected vehicle running speed V, and according to predetermined shift patterns which are relationships between these parameters $\theta_{TH}$ and V and the positions of the transmission 14 that should be established. The predetermined shift patterns are stored in the ROM of the controller 78. The transmission controller 78 controls the solenoid-operated valves S1, S2, S3 so as to place the automatic transmission 14 in the selected position. When the shift lever 72 is operated to a given position by the vehicle operator in the manual shift mode, the controller 78 controls the valves S1, S2 and S3 to select the appropriate position of the automatic transmission 14, even with the throttle opening $\theta_{TH}$ and vehicle speed V held unchanged.

Figure 5:
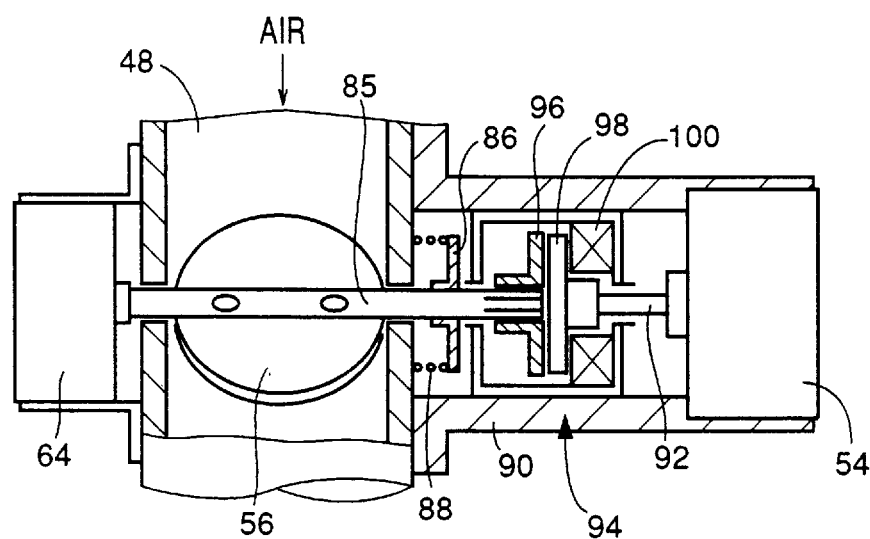
FIG. 5 is a view showing a drive mechanism of a throttle valve shown in FIG. 3.

Referring to FIG. 5, there is shown an example of a mechanism for operating the throttle valve 56 disposed in the intake pipe 48. In this device, the throttle valve 56 is fixed to a support shaft 85 such that the throttle valve 56 is rotatable about the axis of the support shaft 85. The support shaft 85 is connected to the throttle sensor 64 described above, so that the opening $\theta_{TH}$ of the throttle valve 56 is detected by the throttle sensor 64. A return spring 88 is disposed between a spring holder 86 and the intake pipe 48. The throttle valve 56 is biased by the return spring 88 toward an engine idling position thereof at which the opening $\theta_{TH}$ is the smallest. This return spring 88 functions as means for biasing the throttle valve 56.

The throttle actuator 54 functions as a throttle valve drive device for operating the throttle valve 56 to change its amount of opening $\theta_{TH}$. The throttle actuator 54 may be a stepping motor or a DC servomotor. This throttle actuator 54 is attached to the intake pipe via a bracket 90. The support shaft 84 indicated above is connected to an output shaft 92 of the throttle actuator 54 through a clutch device 94, so that a drive force to be transferred from the throttle actuator 54 to the throttle valve 56 is mechanically controlled by the clutch device 94. Thus, the clutch device 94 cooperates with the return spring 88 to function as a throttle drive force control device for mechanically controlling the drive force to be transferred from the throttle actuator 54 to the throttle valve 56.

The clutch device 94 includes a movable friction plate 96, a stationary friction plate 98, and an annular electromagnet 100 for magnetically attracting the movable friction plate 96 toward the stationary friction plate 98. The movable friction plate 96 is splined to an axially end portion of the support shaft 84 so that the movable friction plate 96 is axially movable relative to the support shaft 96 and rotated with the support shaft 96. When the electromagnet 100 is in an energized state, the clutch device 94 is in an engaged state permitting the throttle actuator 54 to control the opening $\theta_{TH}$ of the throttle valve 56. When the electromagnet 100 is in a de-energized state, the clutch device 94 is in a released state, whereby the throttle valve 56 is disconnected from the throttle actuator 54 by the clutch device 94, and is held in its engine idling position under the biasing force of the return spring 88.

Figure 6:
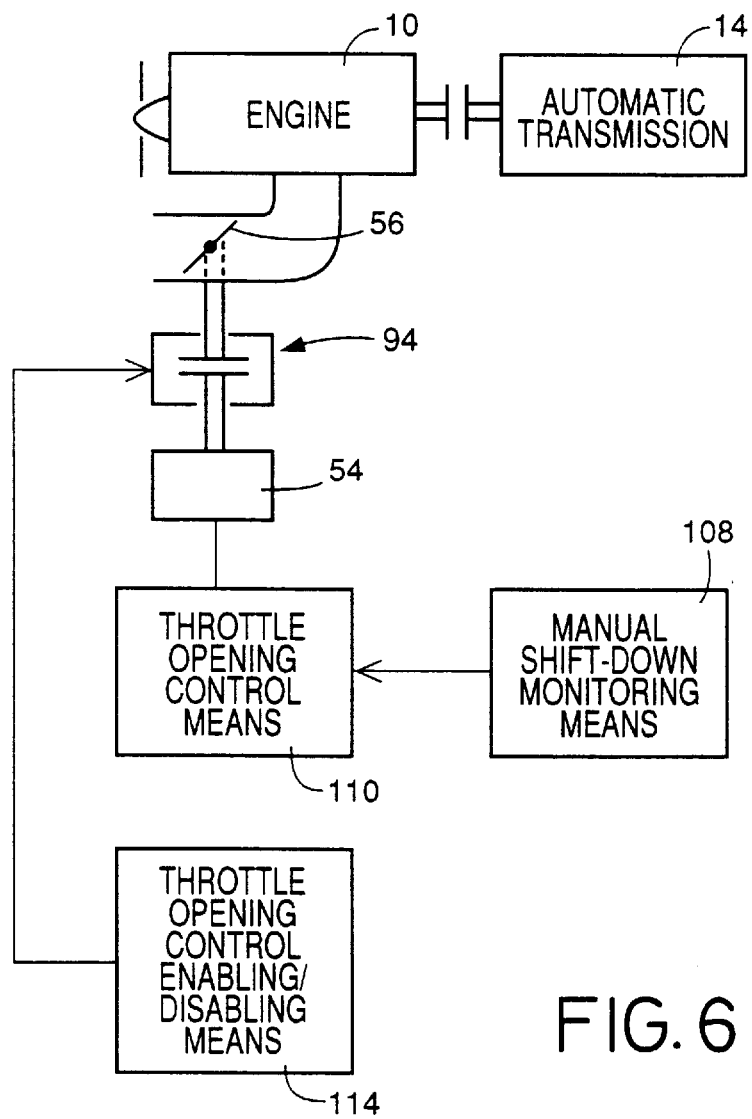
FIG. 6 is a block diagram illustrating major functions of the engine-braking force control apparatus incorporated in the shift control apparatus of FIG. 3.

As illustrated in the functional block diagram of FIG. 6, the shift control apparatus (engine and transmission controllers 76, 78) includes the engine-braking force control apparatus, which incorporates manual shift-down monitoring means 108 for determining a manual shift-down action of the automatic transmission 14 as a result of an operation of the shift lever 72 from the position "D" to any one of the positions "4", "3", "2" and "L". The engine-braking force control apparatus further includes throttle opening control means 110 for increasing the opening $\theta_{TH}$ of the throttle valve 56 by a predetermined amount, that is, effect the so-called "synchro-shift control" of the automatic transmission 14 if the manual shift-down monitoring means 108 has determined the manual shift-down action of the automatic transmission 14. In the synchro-shift control, the throttle valve 56 is opened to temporarily raise the engine speed $N_E$ to a level which is expected to be reached upon completion of the shift-down action of the automatic transmission 14. After the shift-down action is completed, the opening $\theta_{TH}$ is reduced to the original value immediately before the shift-down action. In this synchro-shift control of the automatic transmission 14, the engine speed $N_E$ is temporarily raised primarily by an increase in the engine output as a result of an increase of the throttle opening $\theta_{TH}$ by the throttle opening control means 110. If the synchro-shift control was not effected, the engine speed $N_E$ would be raised by a drive force transmitted from the vehicle drive wheels to the engine 10 as a result of the manual shift-down action of the automatic transmission 14. The synchro-shift control of the automatic transmission 14 by the throttle opening control means 110 is effective to prevent abrupt application of engine braking to the vehicle during the manual shift-down action of the transmission 14, and assure smooth engine braking after the manual shift-down action. Since the opening $\theta_{TH}$ of the throttle valve 56 is returned by the throttle opening control means 110 back to the original value immediately before the shift-down action, the engine braking after the shift-down action is further smoothed.

The engine-braking force control apparatus of the shift control apparatus also includes throttle opening control enabling/disabling means 114 for selectively enabling and disabling the throttle opening control means 110 to normally operate to effect the synchro-shift control of the automatic transmission 14 wherein the throttle opening $\theta_{TH}$ is first increased upon determination of a manual shift-down action of the transmission 14 and is then reduced back to the original value at a predetermined rate. The throttle opening control enabling/disabling means 114 is adapted to detect a delay in the reduction of the once increased throttle opening $\theta_{TH}$ after the manual-shift down action of the transmission 14. If the delay is detected, the throttle opening control enabling/disabling means 114 disables the throttle opening control means 110 to reduce the throttle opening $\theta_{TH}$ at the predetermined rate, by releasing the clutch device 94 (throttle drive force control device) to thereby mechanically disconnect the throttle actuator 54 from the throttle valve 56, whereby the normal operation of the throttle opening control means 110 to reduce the throttle opening at the predetermined rate is inhibited. If the delay is not detected, the enabling/disabling means 114 permits the throttle opening control means 110 to reduce the once increased throttle opening $\theta_{TH}$ at the predetermined rate.

For instance, the throttle opening control enabling/disabling means 114 is adapted to measure a time lapse $T_{ed}$ from the moment of termination of the manual shift-down action of the automatic transmission 14, and effect a determination on the basis of the measured time lapse $T_{ed}$, as to whether the operation of the throttle opening control means 110 to return the throttle opening $\theta_{TH}$ back to the original value is delayed or not. The time lapse $T_{ed}$ may be replaced by a time lapse $T_{sd}$ from the moment of initiation of the manual shift-down action of the transmission 14. If the time lapse $T_{ed}$ or $T_{sd}$ exceeds a predetermined threshold $T_{e^2}$ or $T_{s^2}$, the means 114 determines that the reduction of the throttle opening $\theta_{TH}$ by the throttle opening control means 110 is delayed. In this case, the operation of the throttle opening control means 110 is inhibited, and the clutch device 94 is released to return the throttle valve 56 to the engine idling position at a higher rate. Preferably, the threshold $T_{e^2}$ or $T_{s^2}$ is determined on the basis of the positions of the transmission 14 before and after the shift-down action and the vehicle running speed V, and according to a predetermined relationship as indicated in FIG. 10, by way of example.

Referring to the flow chart of FIG. 7, there will be described a shift-down control routine executed by the engine-braking force control apparatus which includes the manual shift-down monitoring means 108, throttle opening control means 110 and throttle opening control enabling/disabling means 114. The routine is initiated with step SA1 corresponding to the manual shift-down monitoring means 108, to determine whether a manual shift-down action of the automatic transmission 14 is determined by the transmission controller 78 as a result of an operation of the shift lever 72 from the position "D" to any one of the positions "4", "3", "2" and "L". This determination is effected on the basis of the output signal of the shift position sensor 74 indicative of the currently selected position Psh of the shift lever 72. If a negative decision (NO) is obtained in step SA1, one cycle of execution of the present routine is terminated. If an affirmative decision (YES) is obtained in step SA1, the control flow goes to step SA2. The graph of FIG. 8 indicates changes in the engine speed $N_E$, vehicle running speed V and throttle opening $\theta_{TH}$ in the case where a manual shift-down action of the transmission 14 from the 3rd-speed position to the 1st-speed position. In the graph, "t1" indicates a point of time at which the manual shift-down monitoring means 108 has determined that the above-indicated manual 3→2 shift-down action of the transmission 14 should be effected.

Step SA2 is provided to determine whether the various sensors such as the vehicle speed sensor 66 and the input shaft speed sensor 73 are normally functioning. As well known in the art, the sensors are provided with circuits for detecting electrical disconnection and short-circuiting of the sensors. In step SA2, the sensors are checked for any defects such as the electrical disconnection and short-circuiting. If a negative decision (NO) is obtained in step SA2, that is, if any defect of any sensor is detected, the control flow goes to step SA2 in which the manual shift-down action of the automatic transmission 14 is effected. Step SA3 is followed by step SA4 in which the throttle opening control enabling/disabling means 114 disables the throttle opening control means 110, to inhibit the synchro-shift control of the automatic transmission 14, that is, inhibit a temporary increase of the throttle opening $\theta_{TH}$ and a subsequent decrease of the same after the manual shift-down action of the transmission 14.

If an affirmative decision (YES) is obtained in step SA3, that is, the sensors are normally functioning, the control flow goes to step SA5 to effect the manual shift-down action of the automatic transmission 14. Then, step SA6 corresponding to the throttle opening control enabling/disabling means 114 is implemented to enable the throttle opening control means 110 to operate, that is, to permit the synchro-shift control of the automatic transmission 14 which is initiated with an increase in the throttle opening $\theta_{TH}$. Consequently, step SA7 corresponding to the throttle opening control means 110 is then implemented to temporarily increase the opening $\theta_{TH}$ of the throttle valve 56 during the process of the manual shift-down action of the automatic transmission 14, so as to raise the engine speed $N_E$ to a level which is expected to be reached after the completion of the shift-down action. The throttle valve 56 is opened even if it is placed at its fully closed or engine idling position, that is, even if the accelerator pedal 50 is placed in its fully released position according to an operator's desire to decelerate the vehicle. As a result of the synchro-shift control of the transmission 14 in step SA7, the throttle opening $\theta_{TH}$ and the engine speed $N_E$ are increased during a period between t1 and t2, as indicated in the time chart of FIG. 8.

Step SA7 is followed by step SA8 to determine whether the following mathematical formula (1) is satisfied or not:

$$N_{CO} \geq N_{OUT} \times iG + \alpha \qquad (1)$$

The above determination in step SA8 is effected on the basis of the rotating speed $N_{CO}$ of the clutch C0 detected by the input shaft speed sensor 73 and the rotating speed $N_{OUT}$ of the output shaft 40 detected by the vehicle speed sensor 66. If the above formula is satisfied, it means that the manual shift-down action is completed. In the formula, iG represents the speed ratio of the transmission 14 in the position established after the manual shift-down action, while α represents a predetermined value (negative value) corresponding to a time required for the determination in step SA8.

During an initial portion of the manual shift-down action of the automatic transmission 14 which is initiated in step SA5, a negative decision (NO) is obtained in step SA8, whereby the control flow goes to step SA9 to determine whether the above-indicated time lapse $T_{sd}$ from the moment of initiation of the shift-down action in step SA5 is equal to or exceeds a predetermined threshold $T_{s^1}$. This threshold $T_{s^1}$ is determined on the basis of the specific shift-down action of the transmission 14 (positions before and after the shift-down action) and the vehicle running speed V, and according to a predetermined relationship as indicated in FIG. 9 by way of example. The relationship of FIG. 9 is determined by experiments so that the manual shift-down action of the transmission 14 initiated in step SA5 is completed within a time period equal to the determined threshold $T_{s^1}$. During the initial portion of the manual shift-down action, a negative decision (NO) is obtained in step SA9, and the control flow returns to step SA5. Steps SA5–SA9 are repeatedly implemented until an affirmative decision (YES) is obtained in step SA8 or SA9.

Figure 8:
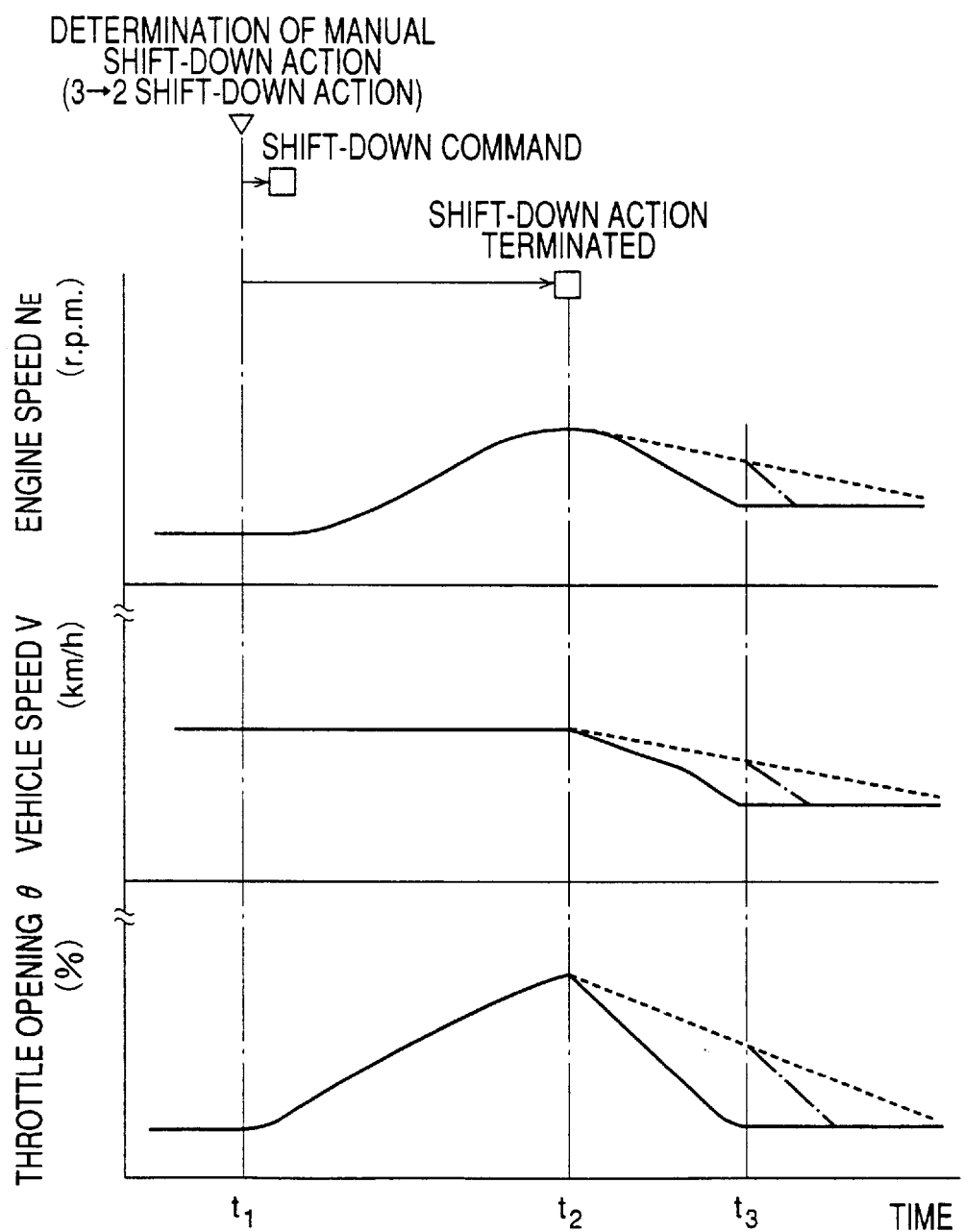
FIG. 8 is a time chart for explaining the operation of the engine-braking force control apparatus of FIG. 3.

If the above formula (1) is satisfied as a result of repeated implementation of steps SA5–SA9, the affirmative decision (YES) is obtained in step SA8, and the control flow goes to step SA10. Even if the negative decision (NO) is obtained in step SA8, the affirmative decision (YES) is obtained in step SA9 after the predetermined time $T_{s^1}$ has passed after the moment of initiation of the manual shift-down action in step SA5. The point of time t2 in FIG. 8 is the moment at which the affirmative decision is obtained in step SA8 or SA9. In step SA10, the shift-down action of the transmission 14 is terminated. Then, the control flow goes to step SA11 in which the opening $\theta_{TH}$ of the throttle valve 56 is reduced toward a value corresponding to the operation amount Acc of the accelerator pedal 50. Usually, the accelerator pedal 50 is placed in its fully released or non-operated position when the shift lever 72 is operated to shift down the transmission 14, since the operator desires to decelerate the vehicle. Consequently, the throttle valve 56 is operated by the throttle actuator 54 to return the throttle opening $\theta_{TH}$ to a value corresponding to the engine idling position of the accelerator pedal 50, during a period between t2 and t3 in FIG. 8.

Step SA11 is followed by steps SA12 and SA13 corresponding to the throttle opening control enabling/disabling means 114. Step SA12 is provided to determine whether the time lapse $T_{sd}$ from the moment of initiation of the manual shift-down action in step SA5 is equal to or larger than the predetermined threshold $T_{s^2}$ which has been described above with respect to the enabling/disabling means 114 by reference to FIG. 10. Step SA12 corresponds to comparing means for comparing the time lapse $T_{sd}$ with the threshold $T_{s^2}$, and determining means for determining a delayed operation of the throttle opening control means 110 to reduce the once increased throttle opening $\theta_{TH}$ after the manual shift-down action of the transmission 14 if the time lapse $T_{sd}$ is equal to or larger than the threshold $T_{s^2}$. If an affirmative decision (YES) is obtained in step SA12, step SA13 is implemented to interrupt the normal operation of the throttle opening control means 110, and release the clutch device 94 to rapidly return the throttle opening $\theta_{TH}$ to the value corresponding to the current position (engine idling position) of the accelerator pedal 50. In other words, if the throttle opening $\theta_{TH}$ is still in the process of being reduced by the throttle opening control means 110 when the predetermined time $T_{s^2}$ has passed, it means that the reduction of the throttle opening $\theta_{TH}$ by the throttle opening control means 110 after the manual shift-down action of the transmission 14 is delayed resulting in giving the vehicle operator an impression that the vehicle deceleration is delayed. As described above, the threshold $T_{s^2}$ which corresponds to point of time t3 in FIG. 8 is determined on the basis of the position of the transmission 14 established by the manual shift-down action and the vehicle speed V, and according to the predetermined relationship (represented by a stored data map) as indicated in FIG. 10. It will be understood that step SA12 is provided for determining whether the operation of the throttle opening control means 110 to return the once increased throttle opening $\theta_{TH}$ is delayed or not.

Immediately after the termination of the manual shift-down action of the transmission 14, a negative decision (NO) is obtained in step SA12. When the point of time t3 as indicated in FIG. 8 is reached during repeated implementation of step SA12, an affirmative decision (YES) is obtained in step SA12, and the control flow goes to step SA13 in which the operation of the throttle opening control means 110 if it is still continued is inhibited or interrupted, and the clutch device 94 is released to disconnect the throttle valve 56 from the throttle actuator 54, whereby the throttle valve 56 is rapidly closed to its engine idling position under the biasing force of the return spring 88. Accordingly, the throttle opening $\theta_{TH}$ is rapidly reduced as indicated by one-dot chain line in the graph of FIG. 8. In this graph, broken lines indicate a case where the reduction of the throttle opening $\theta_{TH}$ is delayed, while solid lines indicate a case where the throttle valve 56 is controlled in the synchro-shift control by the throttle opening control means 110, without interruption by the throttle control enabling/disabling means 114.

As described above, steps S12 and S13 are provided to release the clutch device 94 when a predetermined time has passed after the moment of initiation or termination of the shift-down action of the transmission 14. In the present embodiment, the operation of the throttle opening control means 110 is permitted in step SA6 by the throttle opening control enabling/disabling means 114, and the throttle opening control means 110 is operated in step SA7. The operation of the throttle opening control means 110 is continued until the predetermined time $T_{s^2}$ has passed, that is, until the clutch device 94 is released in step SA13 by the throttle opening control enabling/disabling means 114 upon expiration of the predetermined time $T_{s^2}$ at the point of time t3. As a result of the releasing of the clutch device 94, the throttle valve 56 is forced to be closed to its engine idling position by the return spring 86, so that a delayed return of the throttle valve 56 by the throttle opening control means 110 to its engine idling position is compensated by rapid returning of the throttle valve 56 by the throttle opening control enabling/disabling means 114. The present arrangement is effective to eliminate delayed deceleration of the vehicle by shift-down action of the transmission 14 which may be felt by the vehicle operator due to slow reduction of the once increased throttle opening $\theta_{TH}$ back to the engine idling position.

In the present embodiment, steps SA12 and SA13 are formulated to determine whether the time lapse after the termination of the shift-down action of the transmission 14 exceeds a predetermined threshold, by determining whether the time lapse $T_{sd}$ from the moment of determination or initiation of the shift-down action exceeds the predetermined threshold $T_{s^2}$. This determination does not rely on the speed $N_{OUT}$ of the output shaft 40 of the transmission 14 as detected by the vehicle speed sensor 66, the accuracy of which is not so high when the vehicle speed V is comparatively low.

Referring to FIGS. 11–14, there will be described a second embodiment of this invention. This embodiment employs substantially the same control arrangement as illustrated in FIG. 3. However, the present embodiment uses a MANUAL SHIFT MODE detector switch 120 for detecting the manual shift mode, a SHIFT-DOWN switch 122 for shifting down the automatic transmission 14, and a SHIFT-UP switch 124 for shifting up the automatic transmission 14, as indicated by broken lines in FIG. 3. The output signals of these switches 120, 122, 124 are applied to the electronic transmission controller 78.

Figure 11:
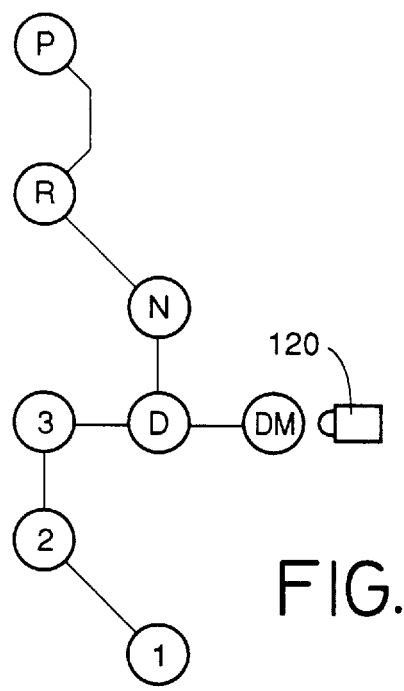
FIG. 11 is a view for explaining operating positions of a shift lever provided in another embodiment of this invention.
Figure 12:
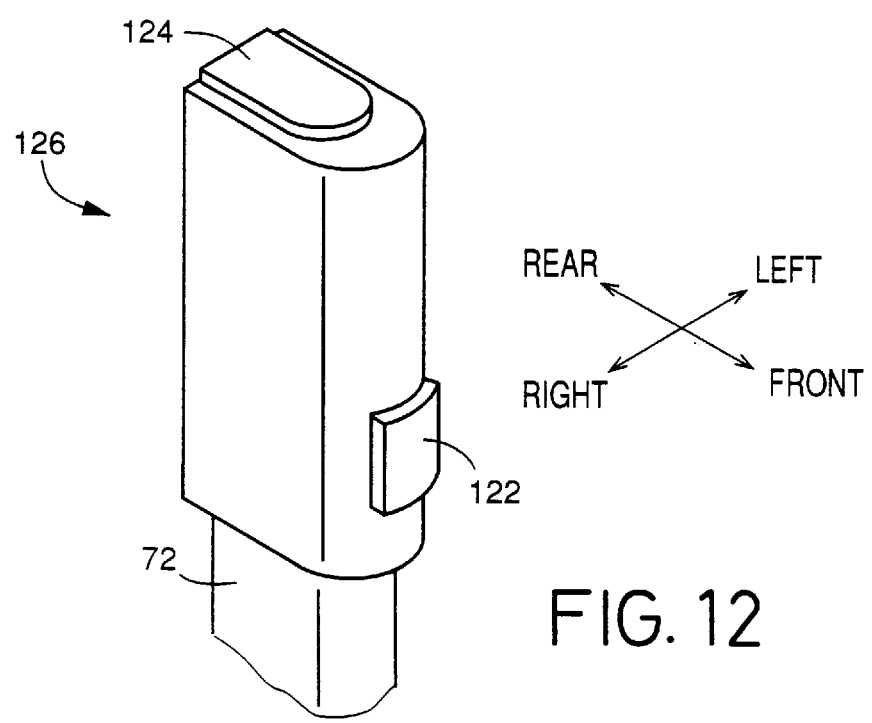
FIG. 12 is a perspective view showing an operating portion of the shift lever in the embodiment of FIG. 11.

In the present second embodiment, the shift lever has operating positions as indicated in FIG. 11, which includes a position "DM". When the shift lever 72 is shifted to the position "DM", the MANUAL SHIFT mode detector switch 120 is turned ON. The above-indicated switches 122, 124 are provided on an upper operating portion of the shift lever 73, as shown in the perspective view of FIG. 12.

While the present embodiment is provided with the manual shift-down monitoring means 108, throttle opening control means 110 and throttle opening control enabling/disabling means 114 as illustrated in FIG. 6, this embodiment is adapted to determine a delayed return of the throttle valve 56 by the throttle opening control means 110 after the termination of the shift-down action of the transmission 14, on the basis of the vehicle speed V or the rotating speed of a rotary member of the transmission 14 (such as the speed $N_{IN}$ of the input shaft 20) after the termination of the shift-down action. More specifically, the determination of the delayed return of the throttle valve 56 is effected by determining whether the vehicle speed V or the speed of a selected member of the transmission 14 (e.g., speed $N_{IN}$) a predetermined time after the termination of the shift-down action of the transmission 14 is equal to or higher than a predetermined threshold. This threshold is preferably determined on the basis of the vehicle speed V and the position of the transmission 14 after the shift-down action, and according to a predetermined relationship as described above with respect to the thresholds $T_{s^1}$ and $T_{s^2}$. If the speed V is equal to higher than the threshold, for example, it means that the return of the throttle valve 56 after the shift-down action is delayed.

Referring to the flow chart of FIG. 13, there will be described a shift-down control routine executed by the engine-braking force control apparatus according to the present second embodiment of the invention. The routine is initiated with step SB1 to determine whether the manual shift mode is selected. This determination is effected based on the output signal of the MANUAL SHIFT MODE switch 120. If a negative decision (NO) is obtained, one cycle of execution of the routine is terminated. If an affirmative decision (YES) is obtained in step SB1, the control flow goes to step SB2 corresponding to the manual shift-down monitoring means 108, to determine whether an operator's controlled member in the form of the MANUAL SHIFT-DOWN switch 122 has been turned ON by the vehicle operator to shift down the transmission 14.

If a negative decision (NO) is obtained in step SB2, one cycle execution of the routine is terminated. If an affirmative decision (YES) is obtained in step SB2, the control flow goes to step SB3 to determine whether the sensors are normally functioning. The point of time t1 in FIG. 8 indicates a time at which the affirmative decision is obtained in step SB2. If a negative decision (NO) is obtained in step SB3, the control flow goes to step SB4 to implement the shift-down action of the transmission 14, and to step SB4 to inhibit the operation of the throttle opening control means 110.

If the affirmative decision (YES) is obtained in step SB2, step SB6 is implemented to store the currently detected vehicle speed V, as a vehicle speed V1 at the time of determination of the shift-down action. Then, steps SB7–SB9 similar to the steps SA5–SA7 of FIG. 7 are implemented. Namely, the shift-down action of the transmission 14 is initiated in step SB6, and the synchro-shift control by the throttle opening control means 110 is permitted in step SB8 corresponding to the throttle opening control enabling/disabling means 114. Then, the throttle opening control means 110 is operated in step SB9. That is, the throttle valve 56 is first opened to temporarily raise the engine speed $N_E$ to a level which is expected to be reached after the completion of the shift-down action of the transmission 14 in question. This operation of the throttle valve 56 is performed even when the throttle valve is fully closed or placed at its engine idling position. As described above with respect to the flow chart of FIG. 7, the synchro-shift control by the throttle opening control means 110 also includes returning of the throttle opening $\theta_{TH}$ to the original value at a predetermined rate in step SB12 after the termination of the shift-down action in step SB11.

Step SB9 is followed by step SB10 similar to step SA8. Unlike the routine of FIG. 7, the present routine of FIG. 13 does not include step similar to step SA9. That is, the control flow goes to step SB6 if an negative decision (NO) is obtained in step SB10. When an affirmative decision (YES) is obtained in step SB10, the control flow goes to steps SB11 and SB12 similar to steps SA10 and SA11.

Step SB12 is followed by steps SB13 and SB14 corresponding to the throttle opening control enabling/disabling means 114. Step SB13 is formulated to determine whether the following mathematical formula (2) is satisfied:

$$V/Vi - \Delta V \qquad (2)$$

where,

V: vehicle speed after completion of the shift-down action of the transmission 14;

V1: vehicle speed detected in step SB6; and $\Delta V$: predetermined value.

It is noted that the vehicle speed V is lowered due to an engine braking effect provided by the shift-down action of the transmission 14. Accordingly, if the above formula (2) is satisfied, it means that the operation of the throttle opening control means 110 to return the throttle opening $\theta_{TH}$ to the value corresponding to the current position of the accelerator pedal 50 is delayed. The predetermined value $\Delta V$ is determined on the basis of the vehicle speed V and the position of the transmission 14 immediately after the shift-down action, and according to a predetermined relationship (represented by a stored data map) as indicated in FIG. 14 by way of example. This relationship is determined by experiments so as to close the throttle valve 56 at a suitable time after the completion of the shift-down action of the transmission 14, for preventing delayed deceleration of the vehicle as felt by the vehicle operator. If the vehicle speed V immediately before the shift-down action is 50 km/h, and the value $\Delta V$ is 5 km/h, for example, the affirmative decision (YES) is obtained in step SB13 when the vehicle speed V after the termination of the shift-down action of the transmission 14 is 45 km/h or higher. The affirmative decision (YES) in step SB13 means that the returning of the throttle valve 56 by the throttle opening control means 110 after the shift-down action is delayed. Step SB13 corresponds to comparing means for comparing the vehicle speed V with a predetermined threshold (V1–$\Delta V$), and determining means for determining a delayed operation of the throttle opening control means 110 to reduce the once increased throttle opening $\theta_{TH}$ after the manual shift-down action of the transmission 14 if the vehicle speed V is equal to or larger than the threshold (V1–$\Delta V$).

Immediately after the termination of the shift-down action of the transmission 14, the negative decision (NO) is obtained in step SB13. This step SB13 is repeatedly implemented until the affirmative decision is obtained, that is, until the point of time t3 indicated in FIG. 8 is reached. When the affirmative decision is obtained in step SB13, the control flow goes to step SB14 to interrupt the operation of the throttle opening control means 110, and release the clutch device 94 for disconnecting the throttle valve 56 from the throttle actuator 54, whereby the throttle valve 54 is rapidly returned or closed to its engine idling position under the biasing force of the return spring 88. Thus, the throttle opening $\theta_{TH}$ is rapidly reduced as indicated by one-dot chain line in FIG. 8, if the returning of the throttle valve 56 after the shift-down action is delayed.

Figure 7:
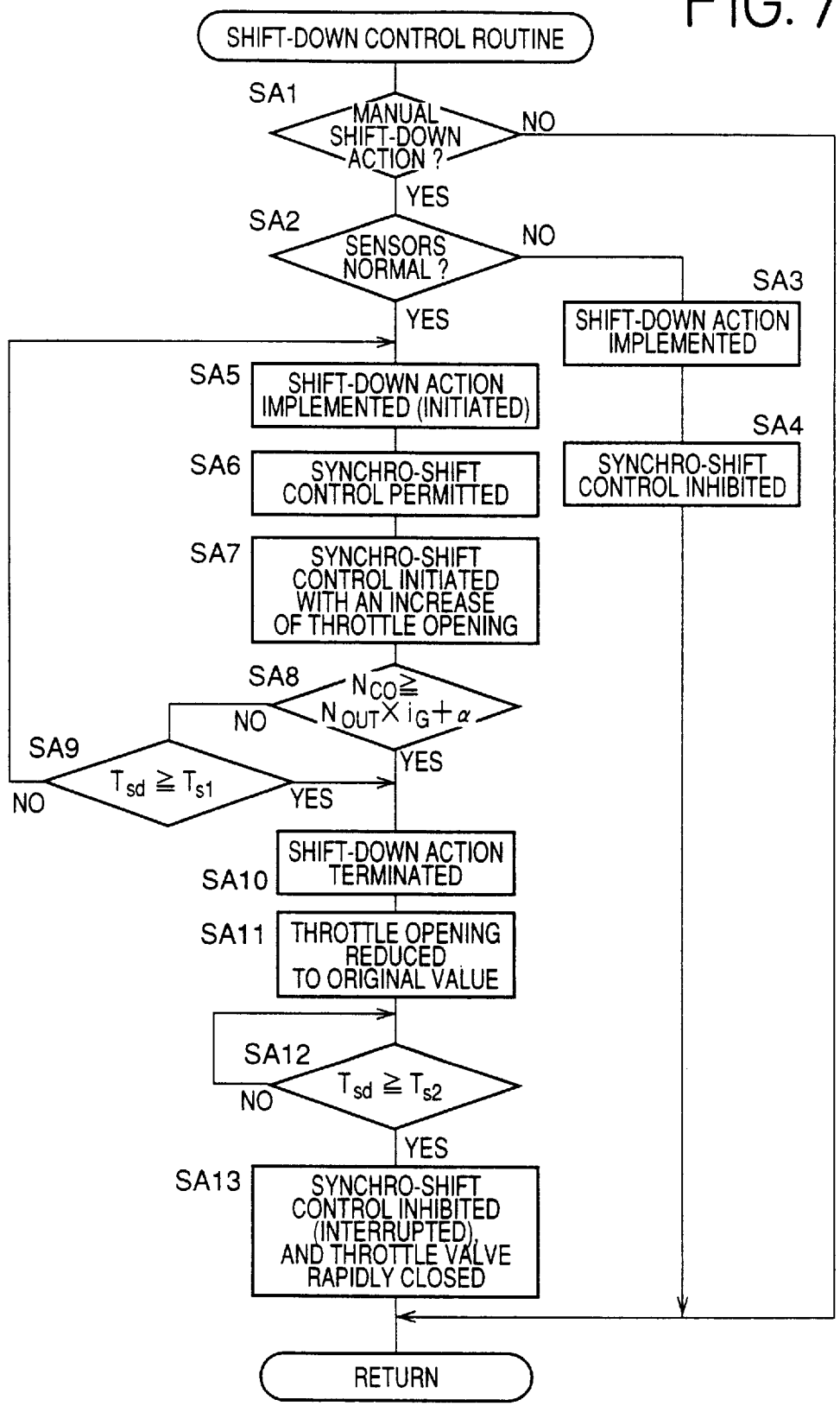
FIG. 7 is a flow chart illustrating a routine executed by the engine-braking force control apparatus to control the engine and automatic transmission.
Figure 13:
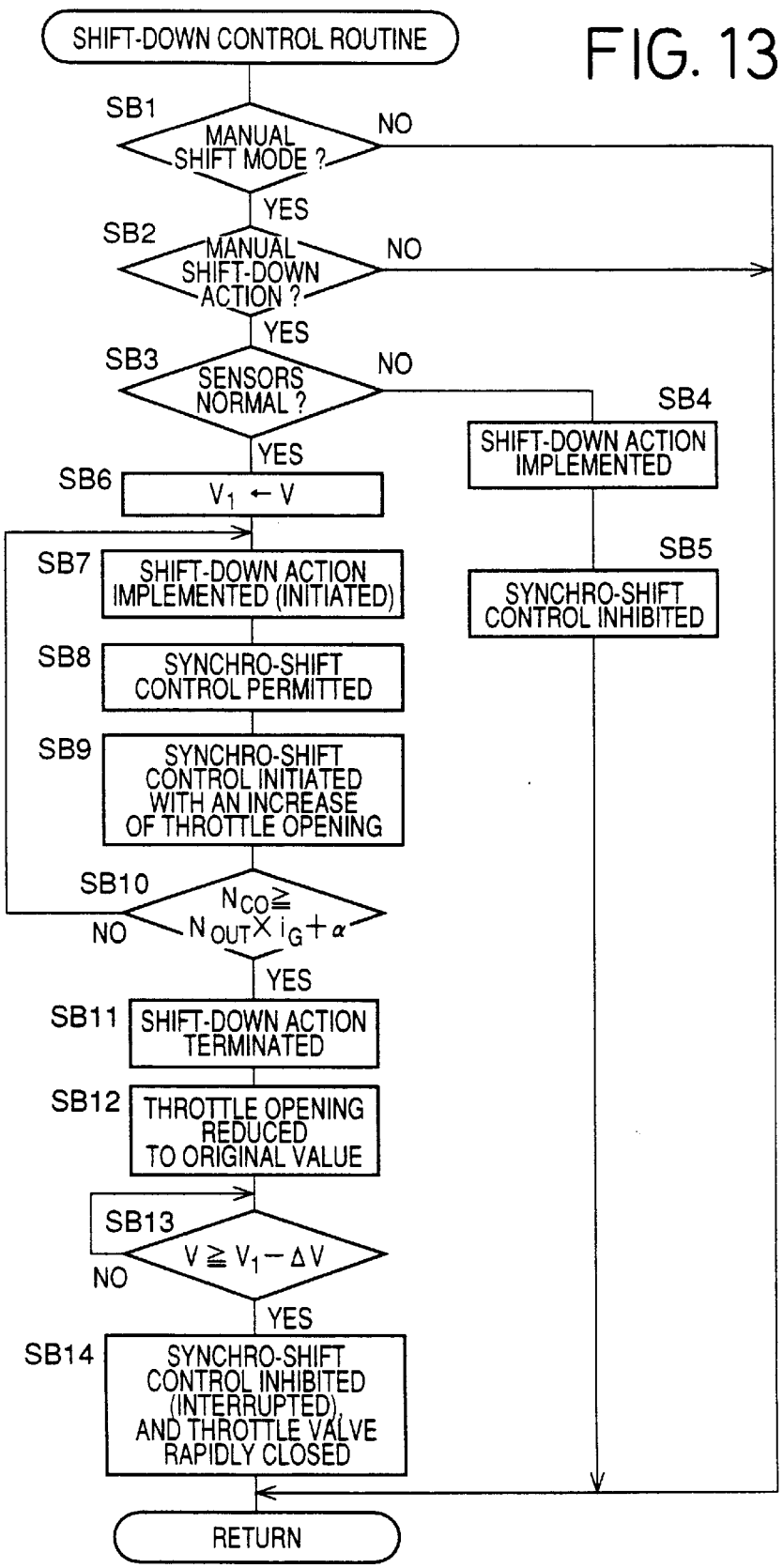
FIG. 13 is a flow chart illustrating a routine executed by an engine-braking force control apparatus according to the embodiment of FIG. 11.

In the present embodiment of FIG. 13, step SB9 corresponds to the throttle opening control means 110, and steps SB8, SB13 and SB14 correspond to the throttle opening control enabling/disabling means 114, This second embodiment provides the same advantage as the first embodiment of FIG. 7.

In the second embodiment, the determination as to whether the returning of the throttle valve 56 to the original value is delayed or not is effected by checking if the vehicle speed V after the shift-down action of the transmission 14 is equal to or higher than a predetermined threshold (V1–$\Delta V$). That is, the above determination is based on the degree of reduction of the vehicle speed V, and can be effected with higher accuracy than the determination based on the time lapse $T_{sd}$ from the moment of initiation of the shift-down action.

Figure 15:
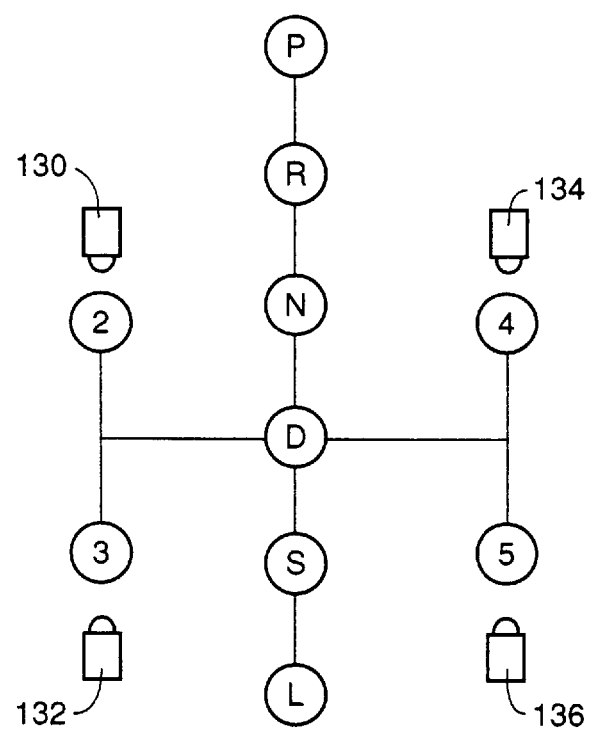
FIG. 15 is a view for explaining operating positions of a shift lever provided in a further embodiment of the present invention.

FIG. 15 shows the operating positions of the shift lever 72 provided in another embodiment of the present invention in place of the shift lever 72 of FIG. 11. The shift lever 72 of FIG. 15 is adapted to select the positions "2", "3", "4" and "5" via the position "D". Those positions "2", "3", "4" and "5" are detected by respective detector switches 130, 132, 134, 136.

Figure 16:
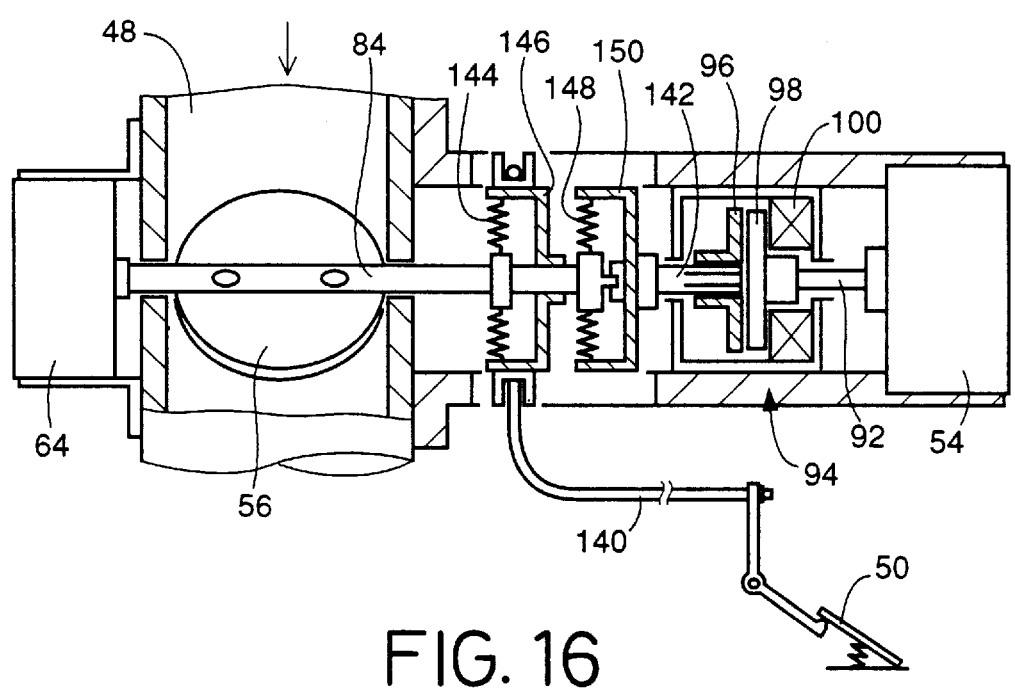
FIG. 16 is a view showing a drive mechanism of a throttle valve used in a still further embodiment of the invention.

FIG. 16 shows a mechanism for driving the throttle valve 56 in a further embodiment of the invention, in place of the mechanism of FIG. 5. In the present embodiment, the accelerator pedal 50 is connected to the support shaft 84 of the throttle valve 56 through a cable 140 and an elastic member in the form of a spring 144, while an output shaft 142 of the clutch device 94 is connected to the output shaft 94 through an elastic member in the form of a spring 148. In this arrangement, the opening $\theta_{TH}$ of the throttle valve 56 is controlled by equilibrium between the operation amount Acc of the accelerator pedal 50 and the operating amount (operating angle) of the throttle actuator 54. The support shaft 84 is connected to a cup-shaped first rotary member 146 through the spring 144 such that the rotary member 146 is rotatable relative to the support shaft 84. The cable 140 is fixed at one end thereof to the cylindrical portion of the rotary member 146. Between one end of the support shaft 84 and the opposed end of the output shaft 142 of the clutch device 94, there is disposed a cup-shaped second rotary member 150 such that the second rotary member 150 is fixed to the output shaft 142 and connected to the above-indicated end of the support shaft 84 through the spring 148.

In the throttle valve drive device of FIG. 16, the opening $\theta_{TH}$ of the throttle valve 56 is controlled by the operation amount Acc of the accelerator pedal 50 when the throttle actuator 54 is placed in a freely rotatable state. When the throttle actuator 54 is operated in a direction opposite to the depressing direction of the accelerator pedal 50, the operation of the throttle actuator 54 will change the throttle opening $\theta_{TH}$ non-linearly in the closing direction of the throttle valve 56. When the throttle actuator 54 is operated in the same direction as the depressing direction of the accelerator pedal 50, the operation of the throttle actuator will change the throttle opening $\theta_{TH}$ non-linearly in the opening direction of the throttle valve 56. In the synchro-shift control by the throttle opening control means 110, the throttle actuator 54 is operated in the same direction as the depressing direction of the accelerator pedal 50, so that the throttle valve 56 is opened by the amount of operation of the throttle actuator 54. When the throttle opening control means 110 is disabled by the throttle opening control enabling/disabling means 114, the clutch device 94 is released so that the throttle valve 56 is closed by the biasing force of the spring 144, to a position corresponding to the operation amount Acc of the accelerator pedal 50, for example, to the engine idling position corresponding to the non-operated position of the accelerator pedal 50. In the present embodiment, the clutch device 94 cooperates with the return spring 144 to constitute a throttle drive force control device.

Figure 17:
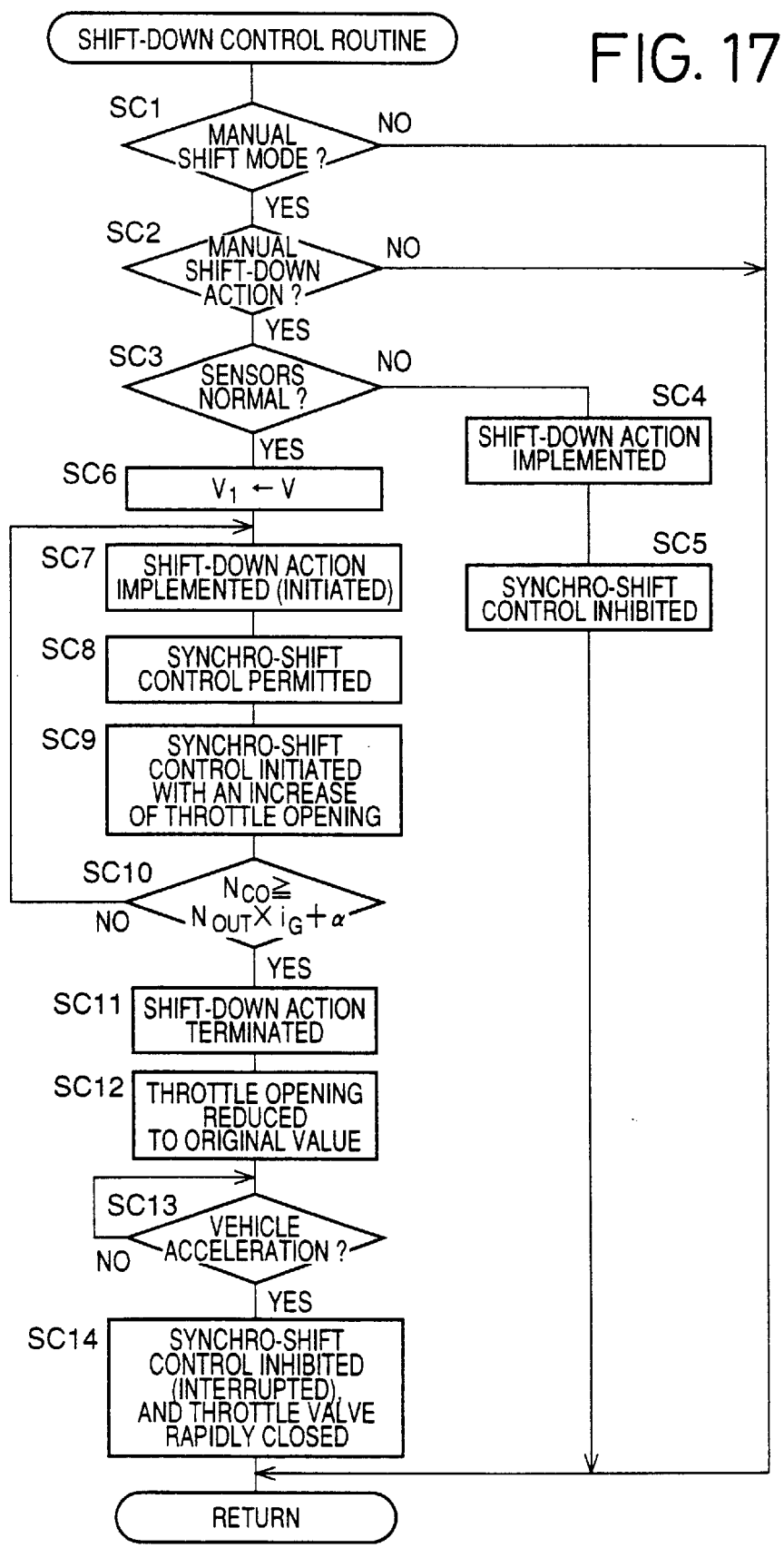
FIG. 17 is a flow chart illustrating a routine executed by an engine-braking force control apparatus according to a further embodiment of the invention.

Referring to the flow chart of FIG. 17, there will be described a shift-down control routine according to a third embodiment of this invention. Steps SC1–SC12 and SC14 of this third routine are identical with steps SB1–SB12 and SB14 of the second embodiment, but step SC13 of the third embodiment is different from the corresponding step SB13 of the second embodiment. Described in detail, step SC13 is provided to determine whether the vehicle is in the process of acceleration. This determination is effected on the basis of the currently detected vehicle running speed V (i.e., vehicle speed after completion of the shift-down action of the transmission 14) as compared with the vehicle speed V1 detected in step SC6. That is, if the currently detected vehicle speed V is higher than the previously detected speed V1, it means that the vehicle is being accelerated, and indicates that the operation of the throttle opening control means 110 to return the throttle opening is delayed. In this case, the control goes to step SC14 to interrupt the operation of the throttle opening control means, and release the clutch device 94 for disconnecting the throttle valve 56 from the throttle actuator 54, so that the throttle valve 54 is rapidly returned to its engine idling position. It will be understood that step SC13 corresponds to determining means for determining whether the vehicle is in the process of acceleration, and determining that a predetermined condition for inhibiting the operation of the throttle opening control means 110 is satisfied, if the vehicle is in the process of acceleration. The determination as to whether the vehicle is in the process of acceleration may be based on a rate of change of the vehicle speed V, an angular acceleration of the propeller shaft of the vehicle, or a difference between the speed of the pump impeller 18 and the speed of the turbine runner 22.

While the presently preferred embodiments of this invention have been described above by reference to the accompanying drawings, it is to be understood that the invention may be otherwise embodied.

In the illustrated embodiments, the throttle opening control enabling/disabling means 114 is arranged to release the clutch device 94 for mechanically disconnecting the throttle valve 56 from the throttle actuator 54 to thereby inhibit the operation of the throttle opening control means 110 (more precisely, reduction of the throttle opening $\theta_{TH}$ after a manual shift-down action of the automatic transmission 14) when a predetermined time has passed after the moment of initiation of the manual shift-down action of the transmission 14. To this end, the first embodiment is adapted to compare the time lapse $T_{sd}$ after the moment of initiation of the manual shift-down action with the threshold $T_{s^2}$ which is determined according to the predetermined relationship as indicated in FIG. 10. However, the threshold may be determined otherwise provided that the comparison of the time lapse $T_{sd}$ with the threshold makes it possible to detect a delayed operation of the throttle opening control means 110 to reduce the once increased throttle opening $\theta_{TH}$ after the manual shift-down action of the transmission 14. The threshold $T_{s^2}$ may be zero or close to zero.

Although the first embodiment compares the time lapse $T_{sd}$ after the moment of initiation of the manual shift-down action with the threshold $T_{s^2}$, the throttle opening control enabling/disabling means 114 may compare the time lapse $T_{ed}$ after the moment of termination of the manual shift-down action with the threshold $T_{e^2}$. Further, the time lapse $T_{sd}$ may be replaced by a time lapse after the moment of determination of the manual shift-down action.

In the illustrated second embodiment of FIG. 13, the throttle opening control enabling/disabling means 114 compares the vehicle speed V with a threshold (V1−ΔV), and inhibits the operation of the throttle opening control means 110 when the speed V is equal to or higher than the threshold. However, the vehicle speed V may be replaced by the speed $N_{IN}$ of the input shaft 20 or speed $N_{OUT}$ of the output shaft 40 of the automatic transmission 14.

The throttle opening control enabling/disabling means 114 may be adapted otherwise to inhibit the operation of the throttle opening control means 110. For instance, step SB13 may follow step SA12 if the affirmative decision (YES) is obtained in step SA12. In this case, the throttle opening control means 110 is disabled by the throttle control opening enabling/disabling means 114 when the affirmative decision is obtained in both of the steps SA12 and SB13.

In the illustrated embodiments, the throttle valve 56 is returned at a comparatively high rate to a position corresponding to the position of the accelerator pedal 50, under the biasing force of the spring 88 or 144 when the clutch device 94 is released as a result of determination or detection of a delayed reduction of the throttle opening angle θTH. However, the throttle valve 56 may be returned toward zero at a comparatively low rate, by a suitable braking device such as a dash pot in addition to the spring.

Step SA1 or SB2 may be implemented only when the throttle opening $\theta_{TH}$ is larger than a predetermined lower limit. In this case, the down-shift control routine of FIG. 7 or 13 is executed only when the transmission 14 is shifted down as a result of operation of the shift lever 72 by the operator for the purpose of decelerating the vehicle, namely, for obtaining an engine braking effect.

In the illustrated embodiments, the relationships for determining the threshold $T_{s^2}$ and the value $\Delta V$ are formulated such that the threshold $T_{s^2}$ and the value $\Delta V$ increase with an increase in the vehicle speed V and with a decrease in the speed ratio of the transmission 14 before and after (FIG. 10) or after (FIG. 14) the shift-down action. However, the threshold $T_{s^2}$ and the value $\Delta V$ may be determined so as to decrease with an increase in the throttle opening $\theta_{TH}$ before the shift-down action of the transmission 14. FIG. 14. In the first embodiment of FIG. 10, the positions before and after the manual shift-down action of the transmission 14 are used to determine the threshold $T_{s^2}$. In the second embodiment of FIG. 14, the position of the transmission 14 after the shift-down action. However, only the position before the shift-down action may be used to determine the threshold $T_{s^2}$, or the positions before and after the shift-down action may be used to determine the value $\Delta V$.

It is to be understood that the present invention may be embodied with various other changes, modifications and improvements, which may occur to those skilled in the art, without departing from the spirit and scope of the invention defined in the following claims.

What is claimed is:

1. An apparatus for controlling an engine-braking force to be applied to a motor vehicle having an engine with a throttle valve, and a automatic transmission, said apparatus comprising:

a throttle valve drive device for operating said throttle valve to change an amount of opening of the throttle valve according to a drive signal;

throttle opening control means, operable upon a manual shift-down action of said automatic transmission as a result of operation of an operator's controlled member, for increasing the amount of opening of said throttle valve to temporarily increase a speed of said engine to a level which is expected to be established after said manual shift-down action, so as to assure smooth application of engine braking to the motor vehicle; and throttle opening control enabling/disabling means for inhibiting an operation of said throttle opening control means when a degree of opening of said throttle valve exceeds a predetermined value at a predetermined time after a selected moment of said manual shift-down action of said automatic transmission, the manual shift-down action being a result of operation of the operator's controlled member.

2. An apparatus according to claim 1, further comprising a throttle drive force control device disposed between said throttle valve and said throttle valve drive device, for mechanically controlling a drive force to be transferred from said throttle valve drive device to said throttle valve, and wherein said throttle opening control enabling/disabling means activates said throttle drive force control device to inhibit the operation of said throttle opening control means when said predetermined condition is satisfied.

3. An apparatus according to claim 1, wherein said throttle opening control means reduces said amount of opening of said throttle valve after completion of said manual shift-down action of said automatic transmission, and said throttle opening control enabling/disabling means comprises comparing means for comparing a time lapse from a selected moment of said manual shift-down action of said automatic transmission, with a predetermined threshold, and determining means for determining a delayed operation of said throttle opening control means to reduce the amount of opening of the throttle valve after completion of said manual shift-down action when said time lapse is equal to or larger than said predetermined threshold, said throttle opening control enabling/disabling means determining that said predetermined condition is satisfied when said determining means determines said delayed operation of said throttle opening control means to reduce the amount of opening of the throttle valve.

4. An apparatus according to claim 1, wherein said throttle opening control means reduces said amount of opening of said throttle valve after completion of said manual shift-down action of said automatic transmission, and said throttle opening control enabling/disabling means comprises comparing means for comparing a selected speed corresponding to a running speed of the motor vehicle after completion of said manual shift-down action of said automatic transmission, with a predetermined threshold, and determining means for determining a delayed operation of said throttle opening control means to reduce the amount of opening of the throttle valve after completion of said manual shift-down action when said selected speed is equal to or higher than said predetermined threshold, said throttle opening control enabling/disabling means determining that said predetermined condition is satisfied when said determining means determines said delayed operation of said throttle opening control means to reduce the amount of opening of the throttle valve.

5. An apparatus according to claim 1, said throttle opening control means reduces said amount of opening of said throttle valve after completion of said manual shift-down action of said automatic transmission, to a value immediately before initiation of said manual shift-down action of said automatic transmission.

6. An apparatus according to claim 1, said throttle opening control means reduces said amount of opening of said throttle valve after completion of said manual shift-down action of said automatic transmission, to a value corresponding to a position of an accelerator pedal after completion of said manual shift-down action of said automatic transmission.

7. An apparatus according to claim 1, wherein said throttle opening control means reduces said amount of opening of said throttle valve after completion of said manual shift-down action of said automatic transmission, and said throttle opening control enabling/disabling means comprises determining means for determining whether the motor vehicle is in the proces of acceleration after completion of said manual shift-down action of said automatic transmission, said determining means determining that said predetermined condition is satisfied, if the motor vehicle is in the process of acceleration after completion of said manual shift-down action.

8. An apparatus for controlling an engine-braking force to be applied to a motor vehicle having an engine with a throttle valve, and an automatic transmission, said apparatus comprising:

a throttle valve drive device for operating said throttle valve to change an amount of opening of the throttle valve according to a drive signal;

a throttle drive force control device disposed between said throttle valve and said throttle valve drive device, for mechanically controlling a drive force to be transferred from said throttle valve drive device to said throttle valve;

throttle opening control means, operable upon a manual shift-down action of said automatic transmission as a result of operation of an operator's controlled member, for increasing the amount of opening of said throttle valve to temporarily increase a speed of said engine to a level which is expected to be established after said manual shift-down action, so as to assure smooth application of engine braking to the motor vehicle; and throttle opening control enabling/disabling means for activating said throttle drive force control device to inhibit an operation of said throttle opening control means when a predetermined condition is satisfied after completion of said manual shift-down action of said automatic transmission, and to permit the operation of said throttle opening control means when said predetermined condition is not satisfied.

9. An apparatus according to claim 8, wherein said throttle valve drive device comprises a throttle actuator, and said throttle drive force control device comprises a clutch disposed between said throttle valve and said throttle actuator.

10. An apparatus according to claim 9, wherein said throttle drive force control device comprises biasing means disposed between said throttle valve and said clutch, for biasing said throttle valve in a direction of reduction of said amount of opening of said throttle valve, said amount of opening being reduced under a biasing force of said biasing means when said clutch is released by said throttle opening control enabling/disabling means when said predetermined condition is satisfied after completion of said manual shift-down action of said automatic transmission.

11. An apparatus for controlling an engine-braking force to be applied to a motor vehicle having an engine with a throttle valve, and an automatic transmission, said apparatus comprising:

a throttle valve drive device for operating said throttle valve to change an amount of opening of the throttle valve according to a drive signal;

throttle opening control means, operable upon a manual shift-down action of said automatic transmission as a result of operation of an operator's controlled member, for increasing the amount of opening of said throttle valve to temporarily increase a speed of said engine to a level which is expected to be established after said manual shift-down action and reducing said amount of opening of said throttle valve after completion of said manual shift-down action of said automatic transmission, so as to assure smooth application of engine braking to the motor vehicle; and throttle opening control enabling/disabling means comprising comparing means for comparing a time lapse from said selected moment of said manual shift-down action of said automatic transmission, with a predetermined threshold, and determining means for determining a delayed operation of said throttle opening control means to reduce the amount of opening of the throttle valve after completion of said manual shift-down action when said time lapse is equal to or larger than said predetermined threshold, said throttle opening control enabling/disabling means inhibiting an operation of said throttle opening control means when said determining means determines said delayed operation of said throttle opening control means, and permitting the operation of said throttle opening control means when said determining means does not determine said delayed operation of said throttle opening control means.

12. An apparatus according to claim 11, wherein said comparing means measures said time lapse from a moment of initiation of said manual shift-down action of said automatic transmission.

13. An apparatus according to claim 11, wherein said comparing means measures said time lapse from a moment of completion of said manual shift-down action of said automatic transmission.

14. An apparatus according to claim 11, wherein said comparing means determines said predetermined threshold on the basis of a running speed of the motor vehicle and a position of said automatic transmission after completion of said manual shift-down action, and according to a predetermined relationship between said predetermined threshold and said running speed and said position of said automatic transmission.

15. An apparatus for controlling an engine-braking force to be applied to a motor vehicle having an engine with a throttle valve, and an automatic transmission, said apparatus comprising:

a throttle valve drive device for operating said throttle valve to change an amount of opening of the throttle valve according to a drive signal;

throttle opening control means, operable upon a manual shift-down action of said automatic transmission as a result of operation of an operator's controlled member, for increasing the amount of opening of said throttle valve to temporarily increase a speed of said engine to a level which is expected to be established after said manual shift-down action and reducing said amount of opening of said throttle valve after completion of said manual shift-down action of said automatic transmission, so as to assure smooth application of engine braking to the motor vehicle; and throttle opening control enabling/disabling means comprising comparing means for comparing a selected speed corresponding to a running speed of the motor vehicle after completion of said manual shift-down action of said automatic transmission, with a predetermined threshold, and determining means for determining a delayed operation of said throttle opening means to reduce the amount of opening of the throttle valve after completion of said manual shift-down action when said selected speed is equal to or larger than said predetermined threshold, said throttle opening control enabling/disabling means inhibiting an operation of said throttle opening control means when said determining means determines said delayed operation of said throttle opening control means, and permitting the operation of said throttle opening control means when said determining means does not determine said delayed operation of said throttle opening control means.

16. An apparatus according to claim 15, wherein said selected speed is said running speed of the motor vehicle after completion of said manual shift-down action of said automatic transmission.

17. An apparatus according to claim 15, wherein said selected speed is a rotating speed of a rotary member of said automatic transmission after completion of said manual shift-down action of said automatic transmission.

18. An apparatus according to 17, wherein said rotary member is an output shaft of said automatic transmission.

19. An apparatus according to claim 17, wherein said rotary member is an input shaft of said automatic transmission.

20. An apparatus according to claim 15, wherein said comparing means determines said predetermined threshold on the basis of a running speed of the motor vehicle before initiation of said manual shift-down action of said automatic transmission and a position of said automatic transmission after completion of said manual shift-down action, and according to a predetermined relationship between said predetermined threshold and said running speed and said position of said automatic transmission.

21. An apparatus for controlling an engine-braking force to be applied to a motor vehicle having an engine with a throttle valve, and an automatic transmission, said apparatus comprising:

a throttle valve drive device for operating said throttle valve to change an amount of opening of the throttle valve according to a drive signal;

throttle opening control means, operable upon a manual shift-down action of said automatic transmission as a result of operation of an operator's controlled member, for increasing the amount of opening of said throttle valve to temporarily increase a speed of said engine to a level which is expected to be established after said manual shift-down action, and reducing said amount of opening of said throttle valve after completion of said manual shift-down action of said automatic transmission, so as to assure smooth application of engine braking to the motor vehicle; and throttle opening control enabling/disabling means comprising determining means for determining whether the motor vehicle is in the process of acceleration after completion of said manual shift-down action of said automatic transmission, said throttle opening control enabling/disabling means inhibiting an operation of said throttle opening control means when said determining means determines that the motor vehicle is in the process of acceleration after completion of said manual shift-down action, and permitting the operation of said throttle opening control means when said determining means does not determine that the motor vehicle is in the process of acceleration after completion of said manual shift-down action.

22. An apparatus according to claim 21, wherein said determining means of said throttle opening control enabling/disabling means determines whether the vehicle is in the process of acceleration, on the basis of a rate of change of a running speed of the vehicle during a period from a moment before initiation of said manual shift-down action of said transmission to a moment after completion of said manual shift-down action.

* * * * *